(12) United States Patent
Yalla et al.

(10) Patent No.: US 10,949,337 B1
(45) Date of Patent: Mar. 16, 2021

(54) UTILIZING NEURAL NETWORK AND ARTIFICIAL INTELLIGENCE MODELS TO SELECT AND EXECUTE TEST CASES IN A SOFTWARE DEVELOPMENT PLATFORM

(71) Applicant: Accenture Global Solutions Limited, Dublin (IE)

(72) Inventors: Muralidhar Yalla, Bangalore (IN); Anand Vijendra, Bangalore (IN); Venugopal Ramakrishnan, London (GB)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 16/667,255

(22) Filed: Oct. 29, 2019

(51) Int. Cl.
*G06F 11/36* (2006.01)
*G06N 3/08* (2006.01)

(52) U.S. Cl.
CPC ...... *G06F 11/3688* (2013.01); *G06F 11/3664* (2013.01); *G06N 3/08* (2013.01)

(58) Field of Classification Search
None
See application file for complete search history.

(56) References Cited

U.S. PATENT DOCUMENTS

| 10,824,549 B1 * | 11/2020 | Desphande | G06F 11/3664 |
| 2008/0077544 A1 * | 3/2008 | Sureka | G06K 9/6282 706/13 |
| 2009/0007078 A1 * | 1/2009 | Hoyek | G06F 11/3688 717/131 |
| 2018/0260314 A1 * | 9/2018 | Singi | G06F 16/9024 |
| 2018/0338187 A1 * | 11/2018 | Ketonen | H04N 21/64738 |
| 2020/0117574 A1 * | 4/2020 | Peng | G06F 11/3664 |

OTHER PUBLICATIONS

Anderson, "On the Use of Neural Networks to Guide Software Testing Activities", 1995, Internal Test Conference (Year: 1995).*
Spieker, "Reinforcement Learning for Automatic Test Case Prioritization and Selection in Continuous Integration", 2017, Software Testing and Analysis, Santa Barbara, CA, USA, Jul. 2017 (ISSTA'17), (Year: 2017).*

* cited by examiner

*Primary Examiner* — Hossain M Morshed
(74) *Attorney, Agent, or Firm* — Harrity & Harrity, LLP

(57) ABSTRACT

A device may receive historical software data associated with a software development platform, and may train a neural network model, with the historical software data, to generate a trained neural network model. The device may receive, from the software development platform, historical test configuration data, and may train an execution model, with the historical test configuration data, to generate a trained execution model. The device may receive software data identifying software to be tested, and may process the software data, with the trained neural network model, to predict a set of test cases to execute for testing the software. The device may process the set of test cases, with the trained execution model, to identify configurations, scripts, and test targets for executing the set of test cases, and may perform one or more actions based on the set of test cases, the configurations, the scripts, and the test targets.

20 Claims, 13 Drawing Sheets

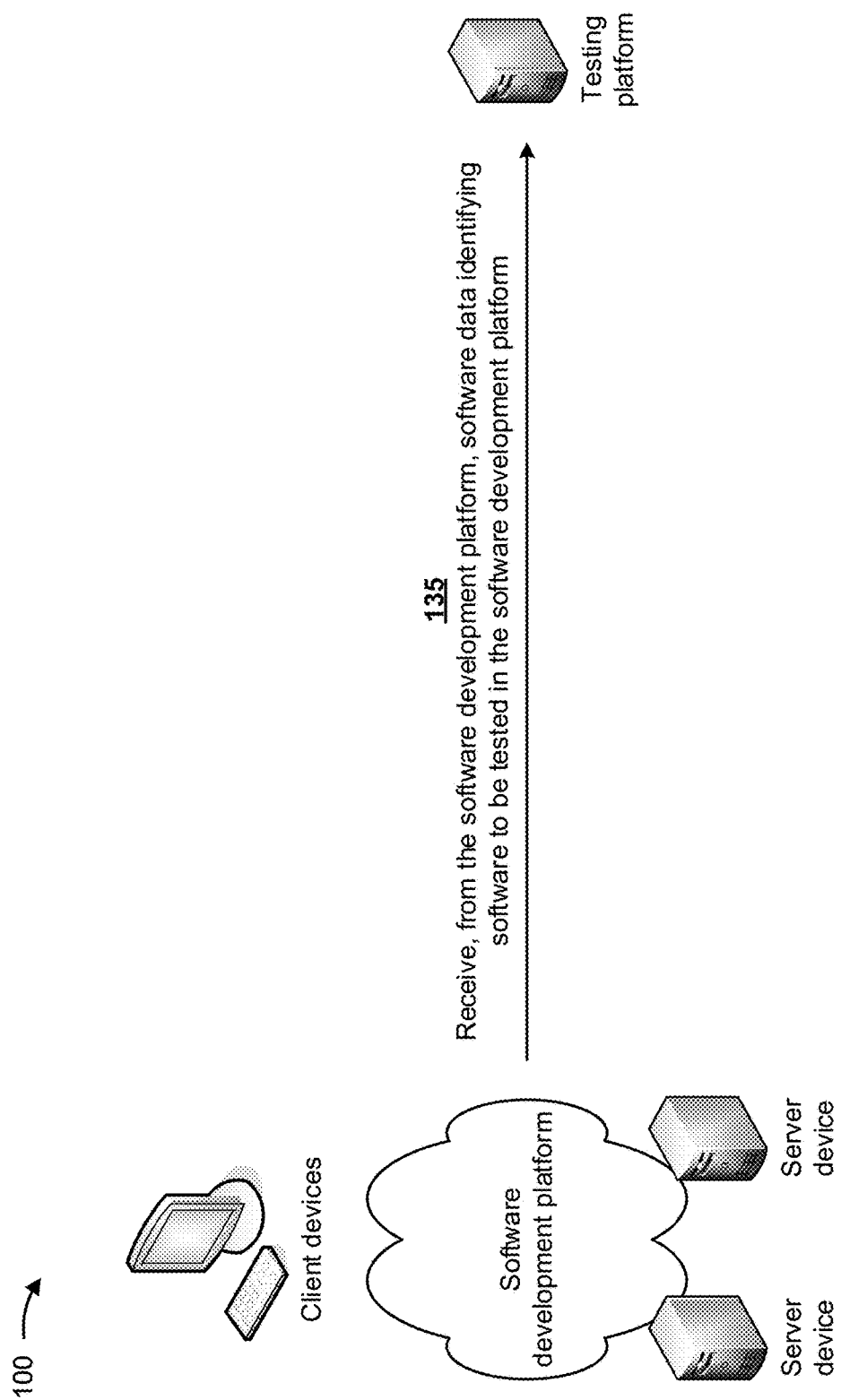

US 10,949,337 B1

UTILIZING NEURAL NETWORK AND ARTIFICIAL INTELLIGENCE MODELS TO SELECT AND EXECUTE TEST CASES IN A SOFTWARE DEVELOPMENT PLATFORM

BACKGROUND

Software development and information technology operations (DevOps) may be utilized to shorten a software development life cycle while delivering features, fixes, updates, and/or the like in close alignment with business objectives. However, current software development life cycle techniques require significant human decision-making processes that are based on multiple factors.

SUMMARY

According to some implementations, a method may include receiving historical software data associated with a software development platform, and training a neural network model, with the historical software data, to generate a trained neural network model. The method may include receiving, from the software development platform, historical test configuration data that includes data identifying historical sets of test cases, historical types of executions performed for the historical sets of test cases, and historical target devices utilized to perform the executions. The method may include training an execution model, with the historical test configuration data, to generate a trained execution model, and receiving software data identifying software to be tested in the software development platform. The method may include processing the software data, with the trained neural network model, to predict a set of test cases to execute for testing the software in the software development platform, and processing the set of test cases, with the trained execution model, to identify one or more of configurations, scripts, or test targets for executing the set of test cases in the software development platform. The method may include performing one or more actions based on the set of test cases and the one or more of the configurations, the scripts, or the test targets.

According to some implementations, a device may include one or more memories; and one or more processors to receive software data identifying software to be tested in a software development platform, and process the software data, with a neural network model, to predict a set of test cases to execute for testing the software in the software development platform. The neural network model may be trained based on historical software data associated with the software development platform. The one or more processors may process the set of test cases, with an execution model, to identify configurations, scripts, and test targets for executing the set of test cases in the software development platform. The execution model may be trained based on historical test configuration data that includes data identifying historical sets of test cases, historical types of executions performed for the historical sets of test cases, and historical target devices utilized to perform the executions. The one more processors may perform one or more actions based on the set of test cases, the configurations, the scripts, and the test targets.

According to some implementations, a non-transitory computer-readable medium may store one or more instructions that, when executed by one or more processors of a device, may cause the one or more processors to receive historical software data associated with a software development platform, and train a neural network model, with the historical software data, to generate a trained neural network model. The one or more instructions may cause the one or more processors to receive, from the software development platform, historical test configuration data, wherein the historical test configuration data includes data identifying historical sets of test cases, historical types of executions performed for the historical sets of test cases, and historical target devices utilized to perform the executions. The one or more instructions may cause the one or more processors to train an execution model, with the historical test configuration data, to generate a trained execution model, and receive software data identifying software to be tested in the software development platform. The one or more instructions may cause the one or more processors to process the software data, with the trained neural network model, to predict a set of test cases to execute for testing the software in the software development platform, and process the set of test cases, with the trained execution model, to identify configurations, scripts, and test targets for executing the set of test cases in the software development platform. The one or more instructions may cause the one or more processors to cause the set of test cases to be executed in the software development platform based on the configurations, the scripts, and the test targets.

BRIEF DESCRIPTION OF THE DRAWINGS

FIGS. 1A-1H are diagrams of one or more example implementations described herein.

DETAILED DESCRIPTION

Figure 1A:
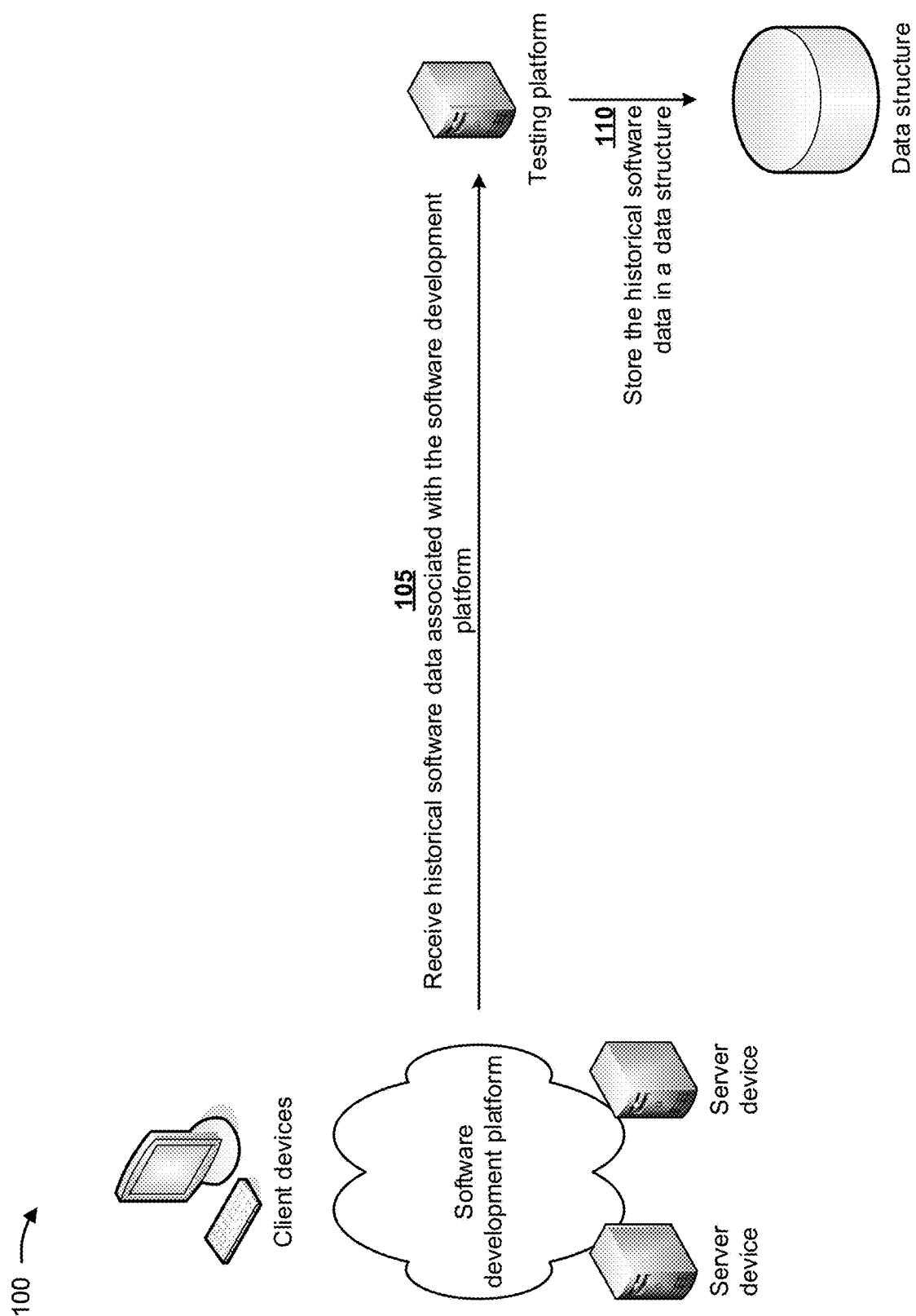

The following detailed description of example implementations refers to the accompanying drawings. The same reference numbers in different drawings may identify the same or similar elements.

Software development and information technology operations may be implemented by a software development platform. The software development platform may include tools for software coding (e.g., code development and review, source code management tools, code merging, and/or the like); software building (e.g., continuous integration tools, build status, and/or the like); software testing (e.g., continuous testing tools that provide quick and timely feedback on business risks); software packaging (e.g., artifact repository, application pre-deployment staging, and/or the like); software releasing (e.g., change management, release approvals, release automation, and/or the like); software configuring (e.g., infrastructure configuration and management, infrastructure as code tools, and/or the like); software monitoring (e.g., applications performance monitoring, end-user experience, and/or the like); and/or the like.

Software testing tools may be industry specific or industry agnostic, and may experience compatibility issues across platforms, adaptability issues in software development processes, management and configuration issues, and/or the like. Current software testing tools are inefficient and unable to handle increasing demands associated with digital software. Non-functional software testing areas, such as performance testing, security testing, usability testing, and accessibility testing, are focused primarily on vendor software products and a siloed delivery platform, and unable to adapt to multiple software platforms, dependencies on other vendor software products, and to quickly identify problem areas for software repair. This wastes computing resources (e.g., processing resources, memory resources, and/or the like), communication resources, networking resources, and/or the like associated with utilizing software testing tools since information from other software development platform tools may reduce resource usage of software testing tools. Furthermore, computing resources, communication resources, networking resources, and/or the like are wasted selecting software tests to test new software requirements and/or defects, identifying corrections for defects, and/or like.

Some implementations described herein provide a testing platform that utilizes neural network and artificial intelligence models to select and execute test cases in a software development platform. For example, the testing platform may receive historical software data associated with a software development platform, and may train a neural network model, with the historical software data, to generate a trained neural network model. The testing platform may receive, from the software development platform, historical test configuration data that includes data identifying historical sets of test cases, historical types of executions performed for the historical sets of test cases, and historical target devices utilized to perform the executions. The testing platform may train an execution model (e.g., an artificial intelligence model), with the historical test configuration data, to generate a trained execution model, and may receive software data identifying software to be tested in the software development platform. The testing platform may process the software data, with the trained neural network model, to predict a set of test cases to execute for testing the software in the software development platform, and may process the set of test cases, with the trained execution model, to identify configurations, scripts, and test targets for executing the set of test cases in the software development platform. The testing platform may perform one or more actions based on the set of test cases, the configurations, the scripts, and the test targets.

In this way, the testing platform utilizes neural network and artificial intelligence models to automatically select and execute test cases in a software development platform. This, in turn, conserves computing resources (e.g., processing resources, memory resources, and/or the like), communication resources, networking resources, and/or the like that would otherwise be wasted inefficiently utilizing software testing tools, selecting tests to handle new software requirements and/or defects, identifying corrections for defects, and/or like. Furthermore, the testing platform enables the software testing tools to be collaborative, demand-based, business-centric, and user-centric; to be modified with minimal impact to a software production environment and/or customers; to provide insights at a software application level and at various stages of a software application development life-cycle that optimize software development, testing, deployment, and maintenance; and/or the like.

FIGS. 1A-1H are diagrams of one or more example implementations 100 described herein. As shown in FIG. 1A, example implementation 100 may include a software development platform, a testing platform, and a data structure. The software development platform may be hosted by a cloud computing environment or by one or more server devices, and may be associated with one or more client devices. The testing platform may be associated with the software development platform, the data structure, and/or one or more client devices.

As further shown in FIG. 1A, and by reference number 105, the testing platform may receive historical software data associated with the software development platform. The historical software data may include data generated by a number of different software development tools associated with the software development platform, such as software testing tools. For example, the historical software data may include software testing and test results data generated by a software testing tool; data identifying software release dynamics, such as software requirements that were introduced and/or modified, software code modules and/or functions implemented for the software requirements, interactions between components of the software testing tools, dependencies among software code, corrections for software bugs, and/or the like; data identifying relationships between software requirements that modify software code modules and/or functions; data identifying software code modules dependent on modified software code; data identifying software code modules that are updated to fix defects; data identifying defects to test cases traceability; data identifying bi-directional test case relations with software code modules; and/or the like.

In some implementations, the historical software data may include software packaging data generated by a software packaging tool, software release data generated by a software releasing tool, software configuration data generated by a software configuring tool, software monitoring data generated by a software monitoring tool, software requirements analysis data, code scan data, software build data (e.g., data identifying code that passed or failed unit testing, a priority status for each testing, and/or the like), software defect data, code quality analyzer data (e.g., data indicating how many times a developer checked a software code module, a quantity of violations in each check-in for each software code module, a priority of standard violations, and/or the like), and/or the like.

In some implementations, the testing platform may extract the historical software data from software development logs associated with the software development tools. For example, the testing platform may employ webhooks to obtain the historical software data from the software development tools. More specifically, the testing platform may employ Python webhooks that scan the software development logs associated with each of the software development tools to identify relevant information.

As further shown in FIG. 1A, and by reference number 110, the testing platform may store the historical software data in a data structure (e.g., a database, a table, a list, and/or the like). The data structure may store the historical software data based on the different software development logs corresponding to the different software development tools. In some implementations, the data structure may store the historical software data in different formats based on different types of historical software data. For example, software requirements data may be stored in word processing formats, image formats, database formats, and/or the like; software build data may be stored as code comments in various code files (e.g., Java files, C files, C++ files, and/or the like); and/or the like.

Figure 1B:
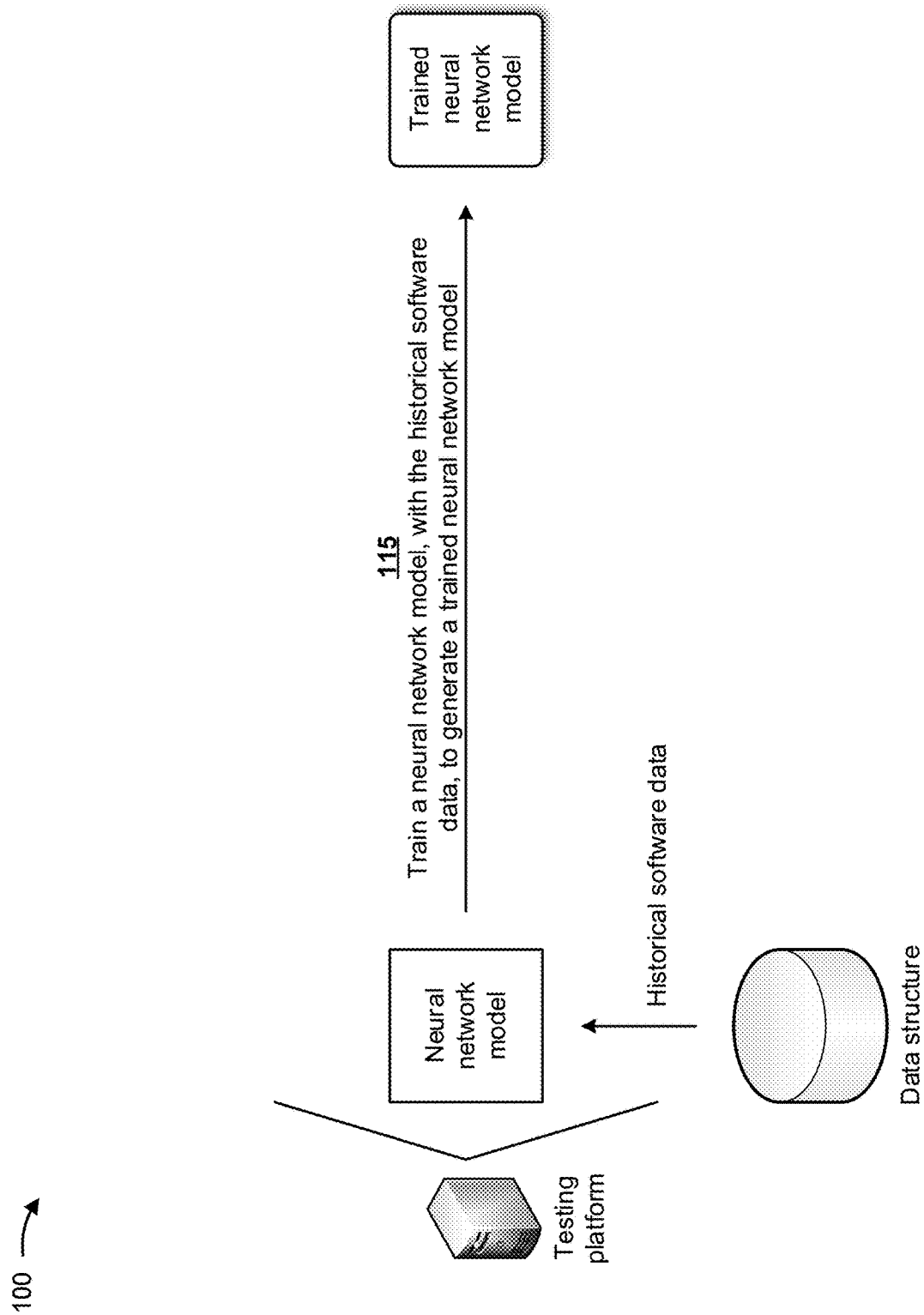

As shown in FIG. 1B, and by reference number 115, the testing platform may train a neural network model, with the historical software data, to generate a trained neural network model. For example, the testing platform may train the neural network model to predict test cases to utilize for testing software associated with the software development platform, as described below. In some implementations, the neural network model may include a long short-term memory model, a time-series model, a neural network with logistic regression model, and/or the like.

In some implementations, the testing platform may separate the historical software data into a training set, a validation set, a test set, and/or the like. The training set may be utilized to train the neural network model. The validation set may be utilized to validate results of the trained neural network model. The test set may be utilized to test operation of the trained neural network model.

In some implementations, the testing platform may train the neural network model using, for example, an unsupervised training procedure and based on the historical software data. For example, the testing platform may perform dimensionality reduction to reduce the historical software data to a minimum feature set, thereby reducing resources (e.g., processing resources, memory resources, and/or the like) to train the neural network, and may apply a classification technique to the minimum feature set.

In some implementations, the testing platform may use a logistic regression classification technique to determine a categorical outcome (e.g., predicting applicability of a test case for testing software). Additionally, or alternatively, the testing platform may use a naïve Bayesian classifier technique. In this case, the testing platform may perform binary recursive partitioning to split the historical software data into partitions and/or branches, and use the partitions and/or branches to determine outcomes (e.g., predicting applicability of a test case for testing software). Based on using recursive partitioning, the testing platform may reduce utilization of computing resources relative to manual, linear sorting and analysis of data points, thereby enabling use of thousands, millions, or billions of data points to train the neural network model, which may result in more accurate models than using fewer data points.

Additionally, or alternatively, the testing platform may use a support vector machine (SVM) classifier technique to generate a non-linear boundary between data points in the training set. In this case, the non-linear boundary is used to classify test data into a particular class.

Additionally, or alternatively, the testing platform may train the neural network model using a supervised training procedure that includes receiving input to the neural network model from a subject matter expert, which may reduce an amount of time, an amount of processing resources, and/or the like to train the neural network model relative to an unsupervised training procedure. In some implementations, the testing platform may use one or more other model training techniques, such as a latent semantic indexing technique, and/or the like. For example, the testing platform may perform an artificial neural network processing technique (e.g., using a two-layer feedforward neural network architecture, a three-layer feedforward neural network architecture, and/or the like) to perform pattern recognition with regard to patterns of the historical software data. In this case, using the artificial neural network processing technique may improve an accuracy of the trained neural network model (e.g., the trained neural network model) generated by the testing platform by making the model more robust to noisy, imprecise, or incomplete data, and by enabling the testing platform to detect patterns and/or trends undetectable to human analysts or systems using less complex techniques.

In some implementations, rather than training the neural network model, the testing platform may obtain the trained neural network model from another system or device that trained the neural network model to generate the trained neural network model. In this case, the testing platform may provide the other system or device with the historical software data for use in training the neural network model, and may provide the other system or device with updated historical software data to retrain the neural network model in order to update the trained neural network model.

In some implementations, the testing platform may generate, based on the historical software data, a feature representation schema (e.g., a feature representation matrix) for the neural network model. For example, the feature representation schema may include the following features and associated rules:

| Field name | Definition | Expected value |
|---|---|---|
| Priority | Priority of test case | 1: High, 2: Medium, 3: Low |
| Executed | Whether test case was executed | 1: Executed, 0: Not executed |
| Result | Result of test case execution | 1: Passed, 0: Failed |
| Defect Raised | Whether defect was raised | 1: Raised, 0: Not raised |
| Req_1...Req_m | Test case traceability to req. | 1: Link to requirement, 0: No link |
| Fund_1...Func_f | Function implemented for req. | 1: Associated, 0: Not-associated |
| Label | Whether test case is applicable | 1: Applicable, 0: Not applicable |

In this way, the historical software data may be represented with associated rules for training the neural network model.

In some implementations, the neural network model may include a logistic regression model with a rectified linear unit activation for intermediate layers and a sigmoid activation for a final layer. In a neural network, an activation function is responsible for transforming a summed weighted input from a node into activation of the node or output for that input. A rectified linear activation function is a piecewise linear function that outputs the input directly, if the input is positive, or outputs zero. A sigmoid function generates an S-shaped curve and may be utilized for models that predict probability as an output (e.g., a probability between range of zero and one). The testing platform may apply one or more rounds of execution and data validation for the neural network model, and may propagate outputs of the execution and/or the data validation back for a next round of execution (e.g., in order to predict test cases).

Computations performed by the neural network model may include a linear forward function, linear forward activation functions, a computing cost function, a back propagation computation, and/or the like. The linear forward function may be represented as:

$$Z = W \cdot X + b,$$

where X may correspond to a feature representation matrix based on the feature representation schema with the details of each execution round as columns, W may correspond to random initial weights for the neural network model, and b may correspond to a random initial bias for the neural network model. The linear forward activation functions (A) may be represented as:

$$A = \text{relu}(Z) \text{ or } A = \text{sigmoid}(Z).$$

A cost (L) may be represented as:

$$L(A, Y) = -Y \cdot \text{Log}(A) - (1-Y) \cdot \text{Log}(1-A),$$

where Y may correspond to a column vector with label values "0" or "1" for each execution round of a specific test case indicating whether the specific test case was executed or not executed. In some implementations, the computing cost function (J) may be represented as:

$$\text{Cost} = J = \frac{1}{m}\sum_{i=0}^{m} L(A, Y),$$

Where m may correspond to a quantity of execution rounds. The back propagation $$\left(\frac{\partial J}{\partial b}\right)$$

may be computed as:

$$dAL = -\left[\frac{Y}{AL} - \frac{1-Y}{1-AL}\right]$$
$$\frac{\partial J}{\partial w} = \frac{1}{m} X \cdot (A - Y)^T$$
$$\frac{\partial J}{\partial b} = \frac{1}{m}\sum_{i=0}^{m}(a^i - y^i)$$

Figure 1C:
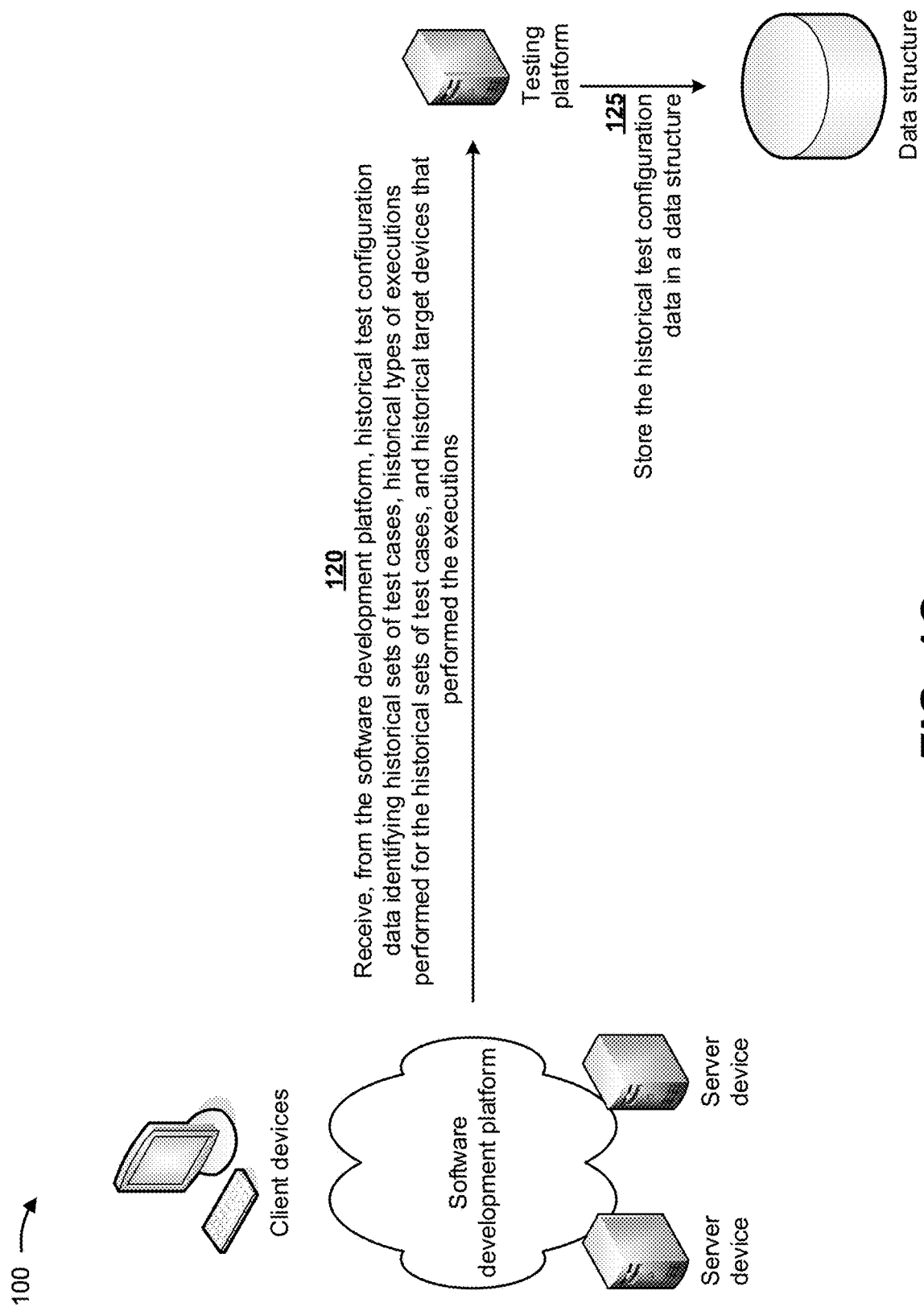

As shown in FIG. 1C, and by reference number 120, the testing platform may receive, from the software development platform, historical test configuration data identifying historical sets of test cases, historical types of executions performed for the historical sets of test cases, historical target devices that performed the executions, and/or the like. The historical sets of test cases may include test cases applied to software that has been previously tested by the software development platform, test cases applied to software associated with the historical software data, and/or the like. For example, the software may include multiple software code modules, and the test cases may be utilized to detect errors or faults in each software code module (e.g., program, application, script, and/or the like) before the software code module is deployed, updated, and/or the like. In some implementations, a test case may include a set of test inputs, execution conditions, expected results, and/or the like associated with a particular test objective.

The historical types of executions performed for the historical sets of test cases may include types of test case executions (e.g., a high priority execution, a medium priority execution, a low priority execution, and/or the like), types of environments in which the test cases were executed (e.g., a pre-production environment, a quality assurance (QA) environment, and/or the like), and/or the like. The historical target devices that performed the executions may include different mobile devices, different device platforms, different operating system versions, different desktop browsers, different cloud devices, and/or the like that performed the executions of the historical sets of test cases.

As further shown in FIG. 1C, and by reference number 125, the testing platform may store the historical test configuration data in a data structure associated with the testing platform, such as the data structure that stores the historical software data, as described above in connection with FIG. 1A. In some implementations, there may be thousands, millions, billions, and/or the like, of data points provided in the data structure associated with the testing platform. In this way, the testing platform may handle thousands, millions, billions, and/or the like, of data points within a period of time (e.g., daily, weekly, monthly), and thus may provide "big data" capability.

Figure 1D:
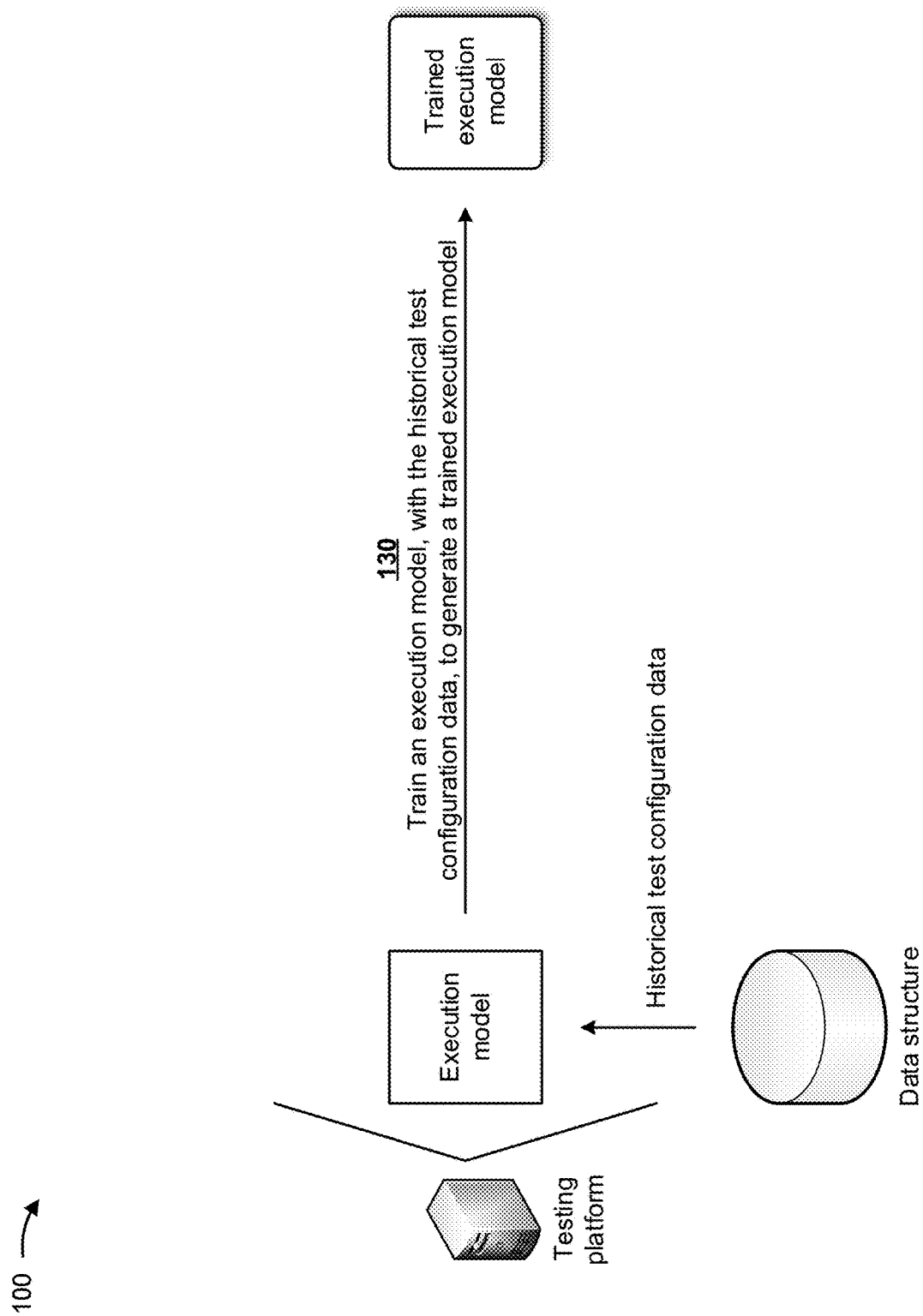

As shown in FIG. 1D, and by reference number 130, the testing platform may train an execution model, with the historical test configuration data, to generate a trained execution model. In some implementations, the testing platform may train the execution model to process sets of test cases and to identify configurations, scripts, test targets, and/or the like for executing the sets of test cases. In some implementations, the execution model may include an artificial intelligence model, such as a deep learning model (e.g., a deep neural network model, a deep belief network model, a recurrent neural network model, a convolutional neural network model, and/or the like).

In some implementations, the testing platform may train the execution model, in a manner similar to the neural network model described above in connection with FIG. 1B, to generate the trained execution model. In some implementations, rather than training the execution model, the testing platform may obtain the execution model from another system or device that trained the execution model to generate the trained execution model. In this case, the testing platform may provide the other system or device with the historical test configuration data for use in training the execution model, and may provide the other system or device with updated historical test configuration data to retrain the execution model in order to update the execution model.

As shown in FIG. 1E, and by reference number 135, the testing platform may receive, from the software development platform, software data identifying software to be tested in the software development platform. The testing platform may periodically receive the software data, may continuously receive the software data, may receive the software data based on a request, and/or the like. The testing platform may store the software data in a data structure (e.g., a database, a table, a list, and/or the like) associated with the testing platform (e.g., accessible to the neural network model). In some implementations, the software data may include data identifying software release dynamics, such as software requirements that were introduced and/or modified, software code modules implemented for the software requirements, interactions between components of the software testing tools, dependencies among software code modules, corrections for software bugs, and/or the like; data identifying relationships between software requirements that modify software code modules and/or functions; data identifying software code modules dependent on modified software code; data identifying software code modules that are updated to fix defects; data identifying defects to test cases traceability; data identifying bi-directional test case relations with software code modules; and/or the like.

Figure 1F:
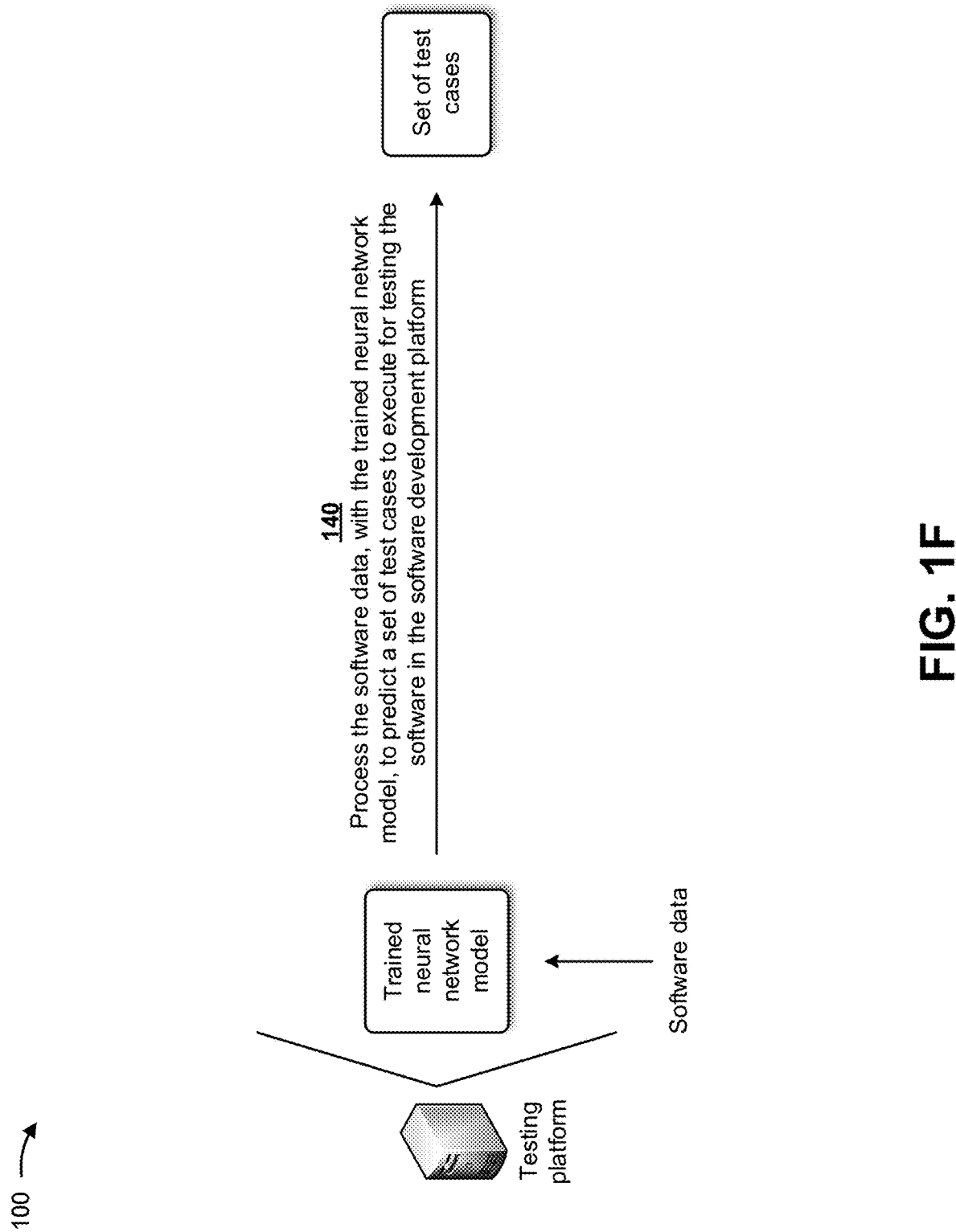

As shown in FIG. 1F, and by reference number 140, the testing platform may process the software data, with the trained neural network model, to predict a set of test cases to execute for testing the software in the software development platform. For example, a test case may include a set of test inputs, execution conditions, expected results, and/or the like developed for a particular objective. The set of test cases may include test cases to be applied to software tested by the software development platform to detect errors or faults in a software code module (e.g., program, application, script, and/or the like) before the software code module is deployed, updated, and/or the like. The set of test cases may include test cases selected from historical sets of test cases that are provided as part of the historical test configuration data, a repository of test cases that is part of the testing platform, a repository of test cases that is part of the software development system, or the like. The set of test cases may also be generated dynamically by the testing platform.

In some implementations, the set of test cases may include a suite of test cases to execute for testing the software in the software development platform. For example, the suite of test cases may include test cases that are optimal (e.g., likely to be useful and/or necessary to execute) for testing the software in the software development platform; test cases that detect errors or faults in a software code module (e.g., program, application, script, and/or the like) before the software code module is deployed, updated, and/or the like; and/or the like.

In some implementations, the testing platform may generate a feature representation schema for the neural network model (e.g., as described above) based on the software data, and may provide the feature representation schema to the trained neural network model. The testing platform may determine which test cases, of multiple test cases, are likely to be necessary for execution based on providing the feature representation schema to the trained neural network model. The testing platform may include the test cases that are likely to be necessary for execution in the set of test cases. In some implementations, the testing platform may identify a sequence of execution of the test cases in the set of test cases. For example, a particular test case may need to be executed prior to another test case.

Figure 1G:
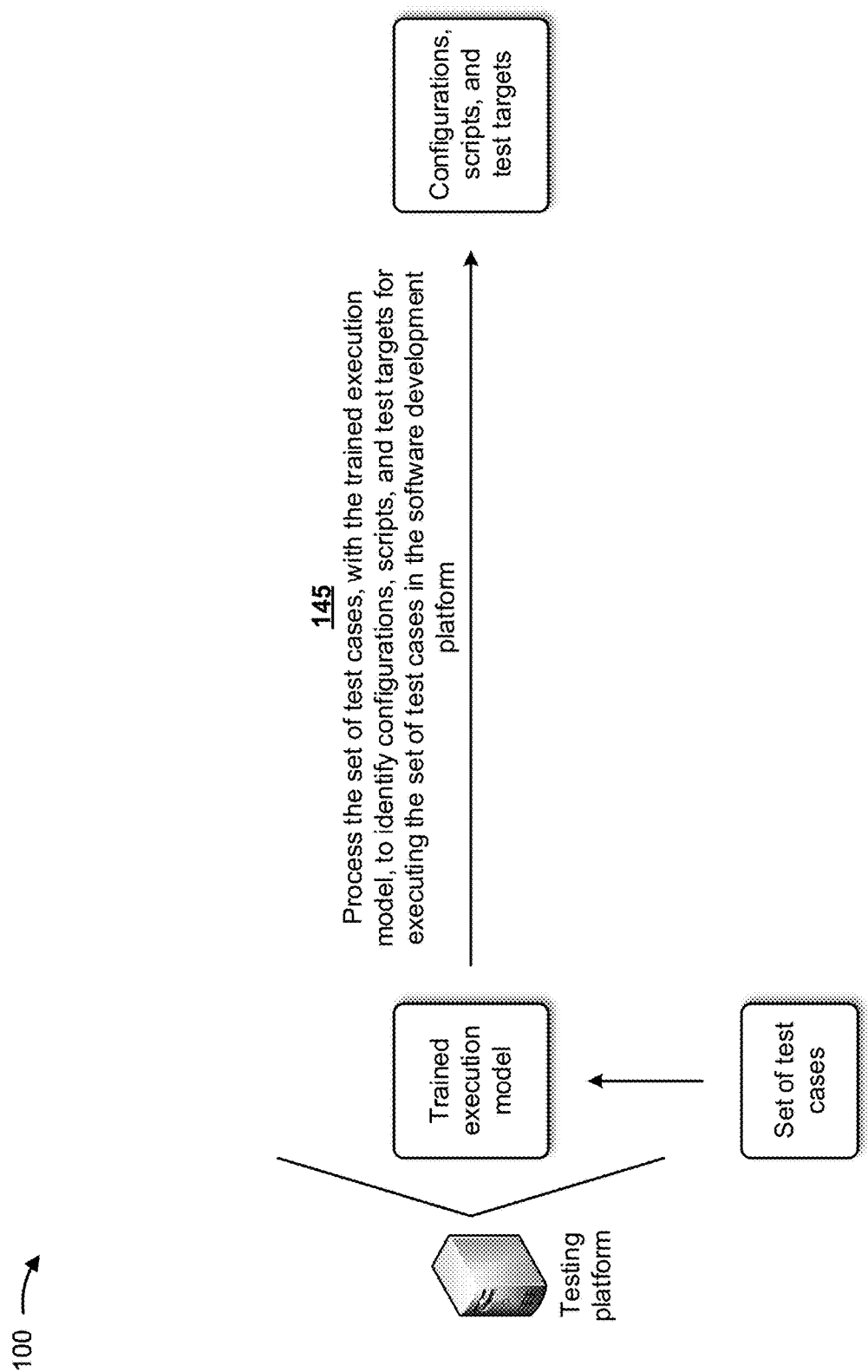

As shown in FIG. 1G, and by reference number 145, the testing platform may process the set of test cases, with the trained execution model, to identify configurations, scripts, and test targets for executing the set of test cases in the software development platform. For example, the testing platform may receive the set of test cases from the trained neural network model, and may provide the set of test cases to the trained execution model. The trained execution model may process the set of test cases to identify configurations, scripts, test targets, and/or the like for executing the set of test cases in the software development platform. In some implementations, the testing platform may provide the set of test cases to the trained execution model in near real-time relative to generating the set of test cases with the trained neural network model.

In some implementations, the configurations may include different combinations or configurations of hardware and software associated with multiple test targets (e.g., machines) on which the software is to be tested. The configurations may enable testing of performance of the software against each of the different combinations of hardware and software associated with the multiple test targets. The hardware configurations may include different memory sizes, different hard drive types, different processors, and/or the like. The software configurations may include different operating system versions, different browsers, different supported drivers, and/or the like.

In some implementations, the scripts may include sets of instructions to be performed on the software in the software development platform. For example, the scripts may include automated test scripts (e.g., short software programs) that the testing platform may execute to automatically test the software in the software development platform to verify that the software performs as expected.

In some implementations, the test targets may include different types of mobile devices, different types of computing devices, different types of platforms, different types of operating system versions, different types of desktop browsers, different types of cloud-computing based devices, and/or the like.

Figure 1H:
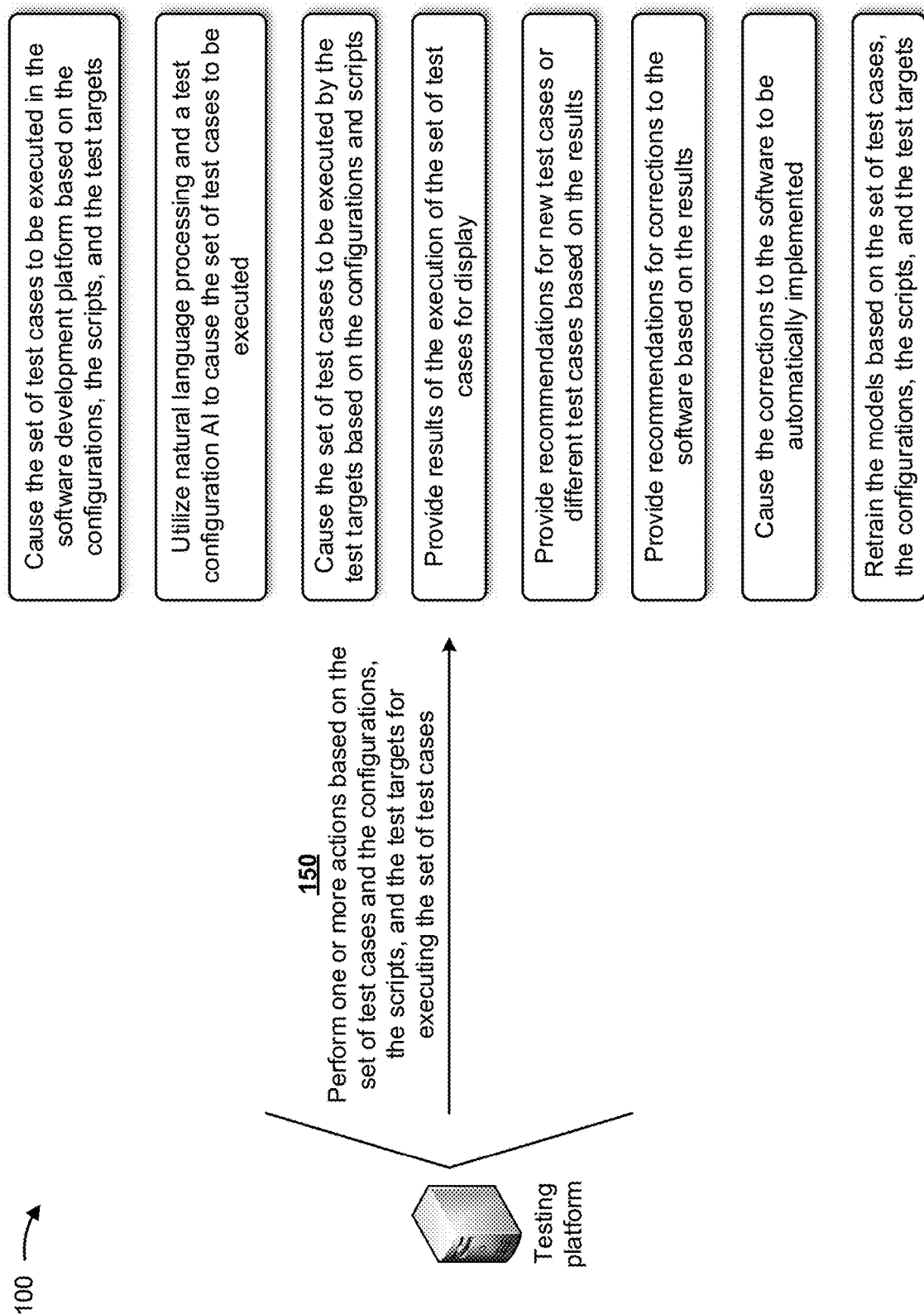

As shown in FIG. 1H, and by reference number 150, the testing platform may perform one or more actions based on the set of test cases and the configurations, the scripts, and the test targets for executing the set of test cases. In some implementations, the one or more actions may include the testing platform causing the set of test cases to be executed in the software development platform based on the configurations, the scripts, and the test targets. In this way, the testing platform may prevent or limit incorrect test cases which generate incorrect configurations, scripts, test targets, and/or the like, execution of the incorrect test cases, and/or the like. This conserves resources (e.g., computing resources, communication resources, networking resources, and/or the like) of the software development platform that would otherwise be wasted executing the incorrect test cases, correcting the incorrect test cases, executing the corrected test cases, and/or the like.

In some implementations, the one or more actions may include the testing platform utilizing natural language processing and a test configuration artificial intelligence (AI) to cause the set of test cases to be executed. For example, the testing platform may utilize a test configuration AI to implement the set of test cases, using the configurations, the scripts, and the test targets in the software development platform. The test configuration AI may interact with a user (e.g., a software tester) to explain the set of test cases, the configurations, the scripts, and/or the test targets, and the user may provide, to the test configuration AI, voice inputs associated with the set of test cases, the configurations, the scripts, and/or the test targets. The test configuration AI may provide the voice inputs to the testing platform, and the testing platform may utilize natural language processing to interpret the voice inputs. The testing platform may utilize the test configuration AI to cause the set of test cases to be executed based on the interpreted voice inputs.

For example, the test configuration AI may receive, from the user, voice inputs specifying a type of execution, test cases to execute, targets to include in execution, and/or the like, and may provide the voice inputs to the testing platform. The testing platform may configure the set of test cases based on the voice inputs, and may cause the configured set of test cases to be executed on the software. Examples of such voice commands may include "execute priority X(n) test cases on a web browser operating system," "execute regression test cases on two types of devices or on both devices operating systems," "execute priority X(n, n−1) test cases on top X(n) mobile devices in a pre-production stage quality assurance environment," and/or the like. In this way, the testing platform may enable addition, enhancement, adjustment, modification, and/or the like to the set of test cases for testing the software, which conserves resources that would otherwise be wasted performing such functions after the set of test cases are executed.

In some implementations, the one or more actions may include the testing platform causing the set of test cases to be executed on the test targets based on the configurations and scripts. For example, the testing platform may cause a virtual machine to be initiated and configured based on the configurations and the scripts, and may cause one or more of the set of test cases to be executed via the virtual machine. In this way, the testing platform may automatically identify and/or invoke an appropriate device, platform, operating system version, browser, and/or the like, for testing the software, which may eliminate a need for the test target to be identified, eliminate human error, and improve speed and efficiency associated with testing the software with the software development platform.

In some implementations, the one or more actions may include the testing platform providing results of the execution of the set of test cases for display. For example, the testing platform may provide the results for display on a client device associated with the testing platform and/or the software development platform. In this way, the testing platform may enable a software tester to view the results and assess and/or modify the software being tested, the set of test cases applied, and/or the like, which improves testing and quality of the software associated with the software development platform.

In some implementations, the one or more actions may include the testing platform providing recommendations for new test cases or different test cases based on the results. For example, if the results indicate that the software includes one or more bugs, the testing platform may recommend a test case to check for the one or more bugs. In this way, the testing platform may provide improved testing scenarios that may be more likely to effectively test and improve the quality of the software associated with the software development platform.

In some implementations, the one or more actions may include the testing platform providing recommendations for corrections to the software based on the results and/or recommendations for new test cases and/or changes to the set of test cases. In this way, the testing platform may automatically facilitate modifications that will eliminate or reduce software errors (e.g., and conserve resources associated with identifying and correcting such errors), while enabling a software tester to make final decisions as to implementing the modifications, which may improve the quality of the software associated with the software development platform.

In some implementations, the one or more actions may include the testing platform causing the corrections to the software to be automatically implemented. In this way, the testing platform may eliminate the need for manual implementation of the software corrections, may shorten a time required to reach a working software product, may conserve resources associated with identifying and correcting software errors, and/or the like.

In some implementations, the one or more actions may include the testing platform retraining the models based on the set of test cases, the configurations, the scripts, and the test targets. In this way, the testing platform may improve the accuracy of the models in determining optimal test cases, configurations, scripts, test targets, and/or the like for testing the software associated with the software development platform, which may improve speed and efficiency of the models and conserve computing resources, communication resources, networking resources, and/or the like.

In some implementations, the one or more actions may include the testing platform configuring software testing tools of the software development platform based on the configurations, and configuring the set of test cases, the scripts, and the test targets for execution based on the configurations. The testing platform may cause the set of test cases to be executed on the test targets, via the software testing tools and based on the scripts, and may provide, for display, results of executing the set of test cases.

In some implementations, the one or more actions may include the testing platform configuring the set of test cases based on the configurations and the scripts, and causing the set of test cases to be executed via the test targets and with a test configuration AI. The testing platform may receive, via the test configuration AI, a voice command associated with execution of the set of test cases, and may process the voice command with a natural language processing technique to identify a request associated with a particular test case of the set of test cases. The testing platform may cause the request associated with the particular test case to be executed via at least one of the test targets.

In some implementations, if the testing platform determines that the software is free of errors and ready to deploy based on testing the software, the testing platform may provide a recommendation to deploy the software, may automatically deploy the software, may cause the software development platform to deploy the software, may make the software available for download, and/or the like.

In this way, neural network and artificial intelligence models are utilized to automatically select and execute test cases in a software development platform. This, in turn, conserves computing resources (e.g., processing resources, memory resources, and/or the like), communication resources, networking resources, and/or the like that would otherwise be wasted inefficiently utilizing software testing tools, selecting tests to handle new software requirements and/or defects, identifying corrections for defects, and/or like. Furthermore, several different stages of the process for selecting and executing test cases in a software development platform may be automated via models, which may improve speed and efficiency of the process and conserve computing resources (e.g., processing resources, memory resources, and/or the like). Implementations described herein use a rigorous, computerized process to perform tasks or roles that were not previously performed. For example, currently there does not exist a technique that utilizes neural network and artificial intelligence models to automatically select and execute test cases in a software development platform. Further, the process for utilizing neural network and artificial intelligence models to automatically select and execute test cases in a software development platform conserves resources (e.g., processing resources, memory resources, network resources, and/or the like) that would otherwise be wasted inefficiently utilizing tools of a software development platform, selecting tests to handle new software requirements and/or defects, identifying corrections for defects, and/or like.

As indicated above, FIGS. 1A-1H are provided merely as examples. Other examples may differ from what is described with regard to FIGS. 1A-1H.

Figure 2:
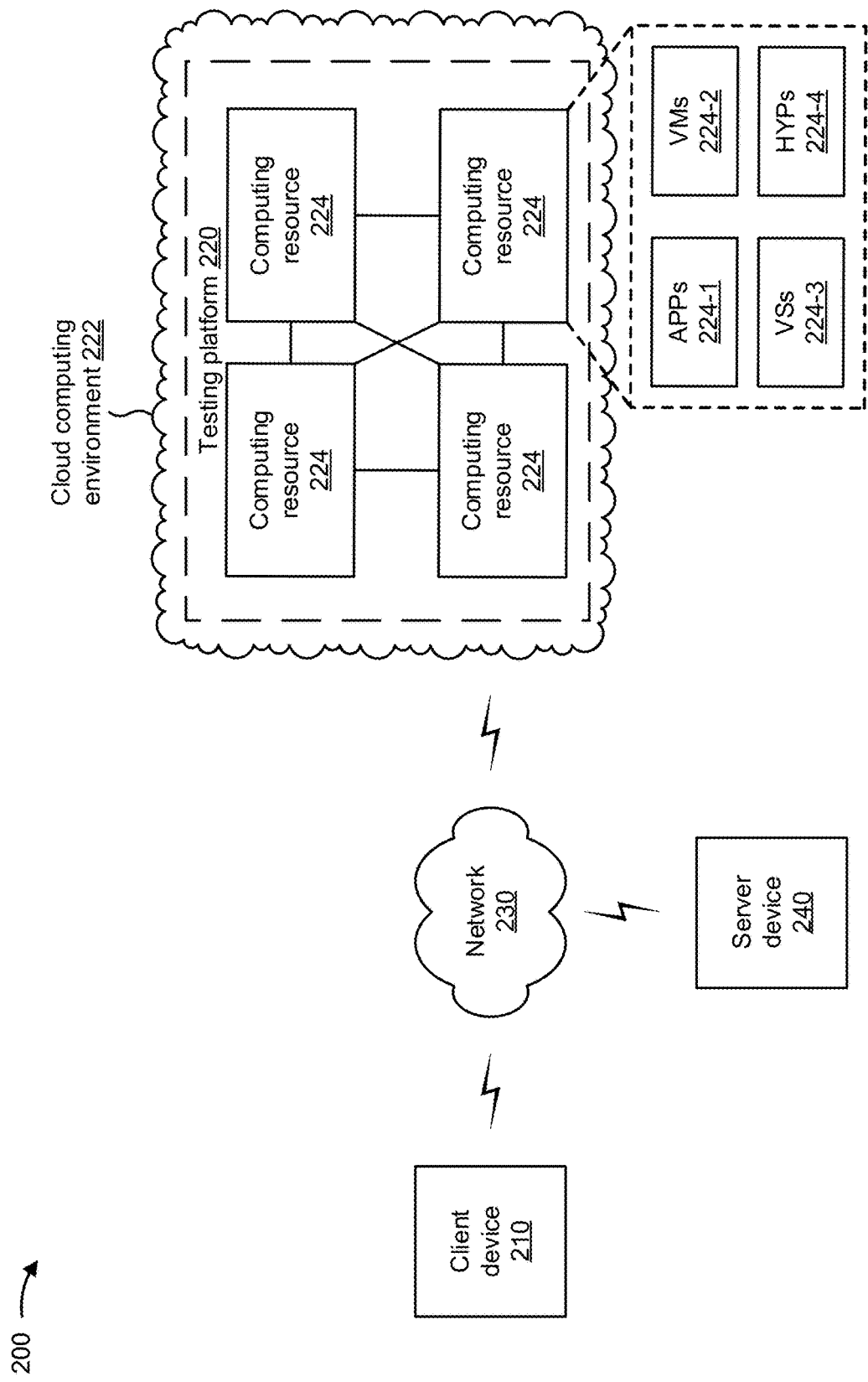
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a client device 210, a testing platform 220, a network 230, and a server device 240. Devices of environment 200 may interconnect via wired connections, wireless connections, or a combination of wired and wireless connections.

Client device 210 includes one or more devices capable of receiving, generating, storing, processing, and/or providing information, such as information described herein. For example, client device 210 may include a mobile phone (e.g., a smart phone, a radiotelephone, and/or the like), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, a head mounted display, and/or the like), or a similar type of device. In some implementations, client device 210 may receive information from and/or transmit information to testing platform 220 and/or server device 240.

Testing platform 220 includes one or more devices that utilize neural network and artificial intelligence models to select and execute test cases in a software development platform. In some implementations, testing platform 220 may be designed to be modular such that certain software components may be swapped in or out depending on a particular need. As such, testing platform 220 may be easily and/or quickly reconfigured for different uses. In some implementations, testing platform 220 may receive information from and/or transmit information to one or more client devices 210 and/or server devices 240.

In some implementations, as shown, testing platform 220 may be hosted in a cloud computing environment 222. Notably, while implementations described herein describe testing platform 220 as being hosted in cloud computing environment 222, in some implementations, testing platform 220 may not be cloud-based (i.e., may be implemented outside of a cloud computing environment) or may be partially cloud-based.

Cloud computing environment 222 includes an environment that hosts testing platform 220. Cloud computing environment 222 may provide computation, software, data access, storage, etc., services that do not require end-user knowledge of a physical location and configuration of system(s) and/or device(s) that hosts testing platform 220. As shown, cloud computing environment 222 may include a group of computing resources 224 (referred to collectively as "computing resources 224" and individually as "computing resource 224").

Computing resource 224 includes one or more personal computers, workstation computers, mainframe devices, or other types of computation and/or communication devices. In some implementations, computing resource 224 may host testing platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by client device 210 and/or server device 240. Application 224-1 may eliminate a need to install and execute the software applications on client device 210. For example, application 224-1 may include software associated with testing platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program and may support a single process. In some implementations, virtual machine 224-2 may execute on behalf of a user (e.g., a user of client device 210 and/or server device 240 or an operator of testing platform 220), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

Server device 240 includes one or more devices capable of receiving, generating, storing, processing, and/or providing information, such as information described herein. For example, server device 240 may include a laptop computer, a tablet computer, a desktop computer, a group of server devices, or a similar type of device, associated with an entity as described above. In some implementations, server device 240 may receive information from and/or transmit information to client device 210 and/or testing platform 220.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
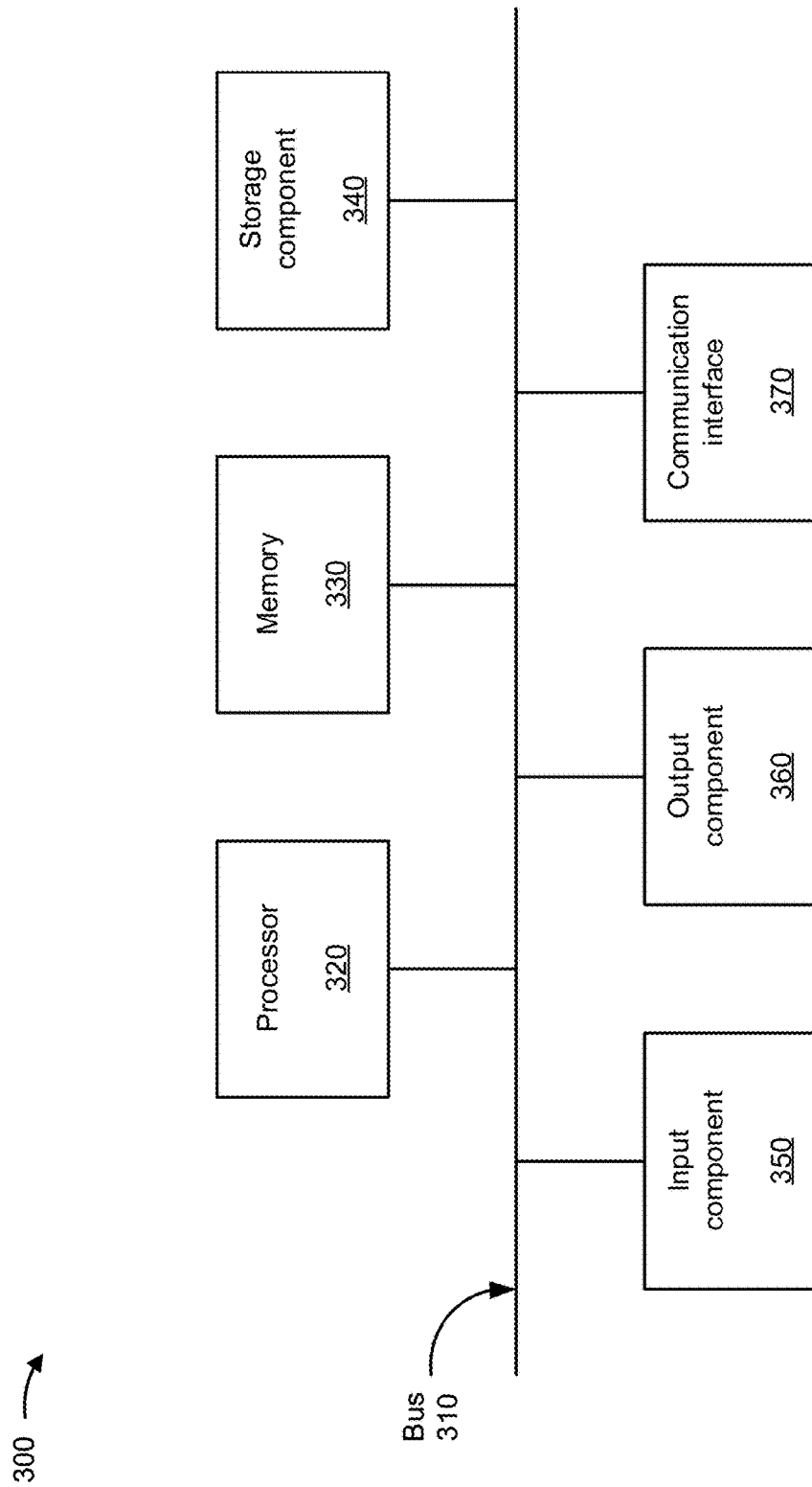
FIG. 3 is a diagram of example components of one or more devices of FIG. 2.

FIG. 3 is a diagram of example components of a device 300. Device 300 may correspond to client device 210, testing platform 220, computing resource 224, and/or server device 240. In some implementations, client device 210, testing platform 220, computing resource 224, and/or server device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
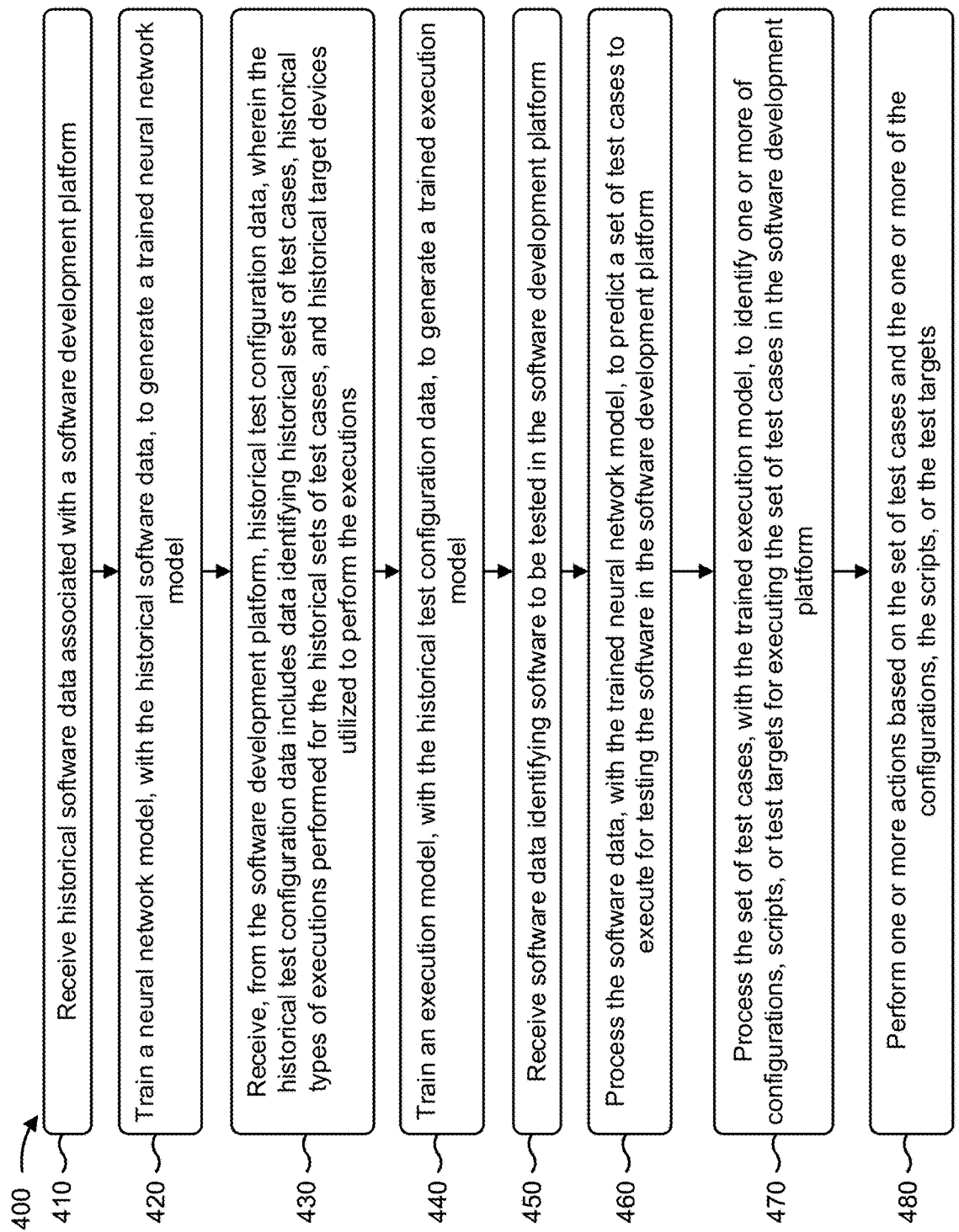
FIGS. 4-6 are flow charts of example processes for utilizing neural network and artificial intelligence models to select and execute test cases in a software development platform.

FIG. 4 is a flow chart of an example process 400 for utilizing neural network and artificial intelligence models to test cases in a software development platform. In some implementations, one or more process blocks of FIG. 4 may be performed by a device (e.g., testing platform 220). In some implementations, one or more process blocks of FIG. 4 may be performed by another device or a group of devices separate from or including the device, such as a client device (e.g., client device 210), a server device (e.g., server device 240), and/or the like.

As shown in FIG. 4, process 400 may include receiving historical software data associated with a software development platform (block 410). For example, the device (e.g., using computing resource 224, processor 320, communication interface 370, and/or the like) may receive historical software data associated with a software development platform, as described above.

As further shown in FIG. 4, process 400 may include training a neural network model, with the historical software data, to generate a trained neural network model (block 420). For example, the device (e.g., using computing resource 224, processor 320, memory 330, and/or the like) may train a neural network model, with the historical software data, to generate a trained neural network model, as described above.

As further shown in FIG. 4, process 400 may include receiving, from the software development platform, historical test configuration data, wherein the historical test configuration data includes data identifying historical sets of test cases, historical types of executions performed for the historical sets of test cases, and historical target devices utilized to perform the executions (block 430). For example, the device (e.g., using computing resource 224, processor 320, communication interface 370, and/or the like) may receive, from the software development platform, historical test configuration data, as described above. In some implementations, the historical test configuration data may include data identifying historical sets of test cases, historical types of executions performed for the historical sets of test cases, and historical target devices utilized to perform the executions.

As further shown in FIG. 4, process 400 may include training an execution model, with the historical test configuration data, to generate a trained execution model (block 440). For example, the device (e.g., using computing resource 224, processor 320, storage component 340, and/or the like) may train an execution model, with the historical test configuration data, to generate a trained execution model, as described above.

As further shown in FIG. 4, process 400 may include receiving software data identifying software to be tested in the software development platform (block 450). For example, the device (e.g., using computing resource 224, processor 320, communication interface 370, and/or the like) may receive software data identifying software to be tested in the software development platform, as described above.

As further shown in FIG. 4, process 400 may include processing the software data, with the trained neural network model, to predict a set of test cases to for testing the software in the software development platform (block 460). For example, the device (e.g., using computing resource 224, processor 320, memory 330, and/or the like) may process the software data, with the trained neural network model, to predict a set of test cases to execute for testing the software in the software development platform, as described above.

As further shown in FIG. 4, process 400 may include processing the set of test cases, with the trained execution model, to identify one or more of configurations, scripts, or test targets for executing the set of test cases in the software development platform (block 470). For example, the device (e.g., using computing resource 224, processor 320, memory 330, storage component 340, and/or the like) may process the set of test cases, with the trained execution model, to identify one or more of configurations, scripts, or test targets for executing the set of test cases in the software development platform, as described above.

As further shown in FIG. 4, process 400 may include performing one or more actions based on the set of test cases and the one or more of the configurations, the scripts, or the test targets (block 480). For example, the device (e.g., using computing resource 224, processor 320, memory 330, storage component 340, communication interface 370, and/or the like) may perform one or more actions based on the set of test cases and the one or more of the configurations, the scripts, or the test targets, as described above.

Process 400 may include additional implementations, such as any single implementation or any combination of implementations described below and/or in connection with one or more other processes described elsewhere herein.

In a first implementation, the historical software data may include data identifying one or more of software requirements that were introduced or modified, software code modules implemented for the software requirements, interactions between components of software testing tools of the software development platform, dependencies among software code, or corrections for software bugs.

In a second implementation, alone or in combination with the first implementation, processing the software data, with the trained neural network model, to predict the set of test cases may include process 400 generating a feature representation schema based on the software data; providing the feature representation schema to the trained neural network model; determining which test cases, of a plurality of test cases, are likely to be necessary for execution based on providing the feature representation schema to the trained neural network model; and including the test cases that are likely to be necessary for execution in the set of test cases.

In a third implementation, alone or in combination with one or more of the first and second implementations, the neural network model may include a neural network with logistic regression model, rectified linear unit activation for intermediate layers, and sigmoid activation for a final layer.

In a fourth implementation, alone or in combination with one or more of the first through third implementations, the neural network model may include one or more of a long short-term memory model, a time-series model, or a neural network with logistic regression model.

In a fifth implementation, alone or in combination with one or more of the first through fourth implementations, performing the one or more actions may include process 400 causing the set of test cases to be executed in the software development platform based on the one or more of the configurations, the scripts, or the test targets; utilizing natural language processing and a test configuration AI to cause the set of test cases to be executed in the software development platform; causing the set of test cases to be executed on the test targets based on the configurations and the scripts; or providing results of execution of the set of test cases for display.

In a sixth implementation, alone or in combination with one or more of the first through fifth implementations, performing the one or more actions may include process 400 providing recommendations for new test cases or different test cases based on results of execution of the set of test cases; providing recommendations for corrections to the software based on results of execution of the set of test cases; causing the corrections to the software to be automatically implemented by the software development platform; or retraining the neural network model or the execution model based on the set of test cases and the one or more of the configurations, the scripts, or the test targets.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
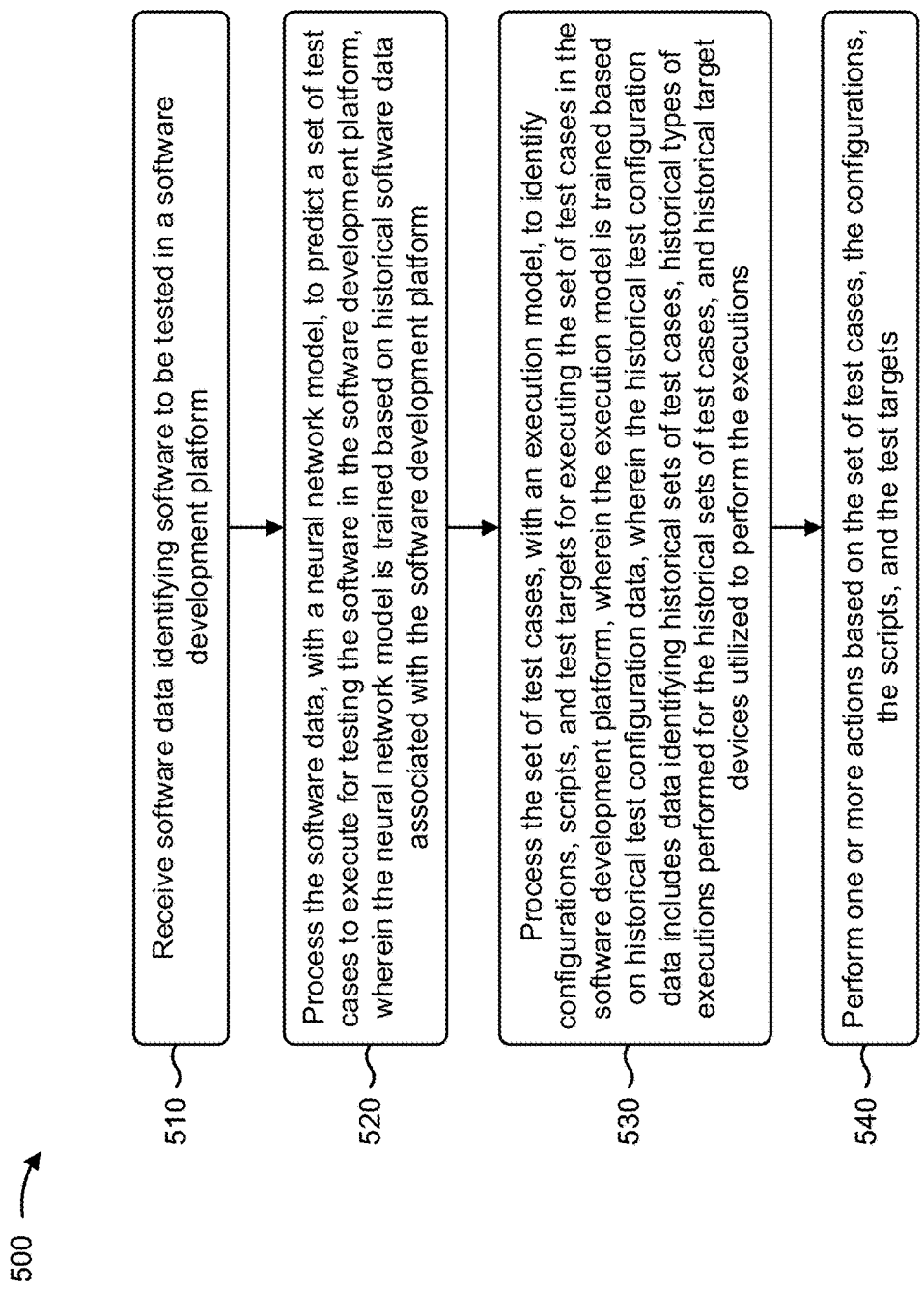

FIG. 5 is a flow chart of an example process 500 for utilizing neural network and artificial intelligence models to select and execute test cases in a software development platform. In some implementations, one or more process blocks of FIG. 5 may be performed by a device (e.g., testing platform 220). In some implementations, one or more process blocks of FIG. 5 may be performed by another device or a group of devices separate from or including the device, such as a client device (e.g., client device 210), a server device (e.g., server device 240), and/or the like.

As shown in FIG. 5, process 500 may include receiving software data identifying software to be tested in a software development platform (block 510). For example, the device (e.g., using computing resource 224, processor 320, communication interface 370, and/or the like) may receive software data identifying software to be tested in a software development platform, as described above.

As further shown in FIG. 5, process 500 may include processing the software data, with a neural network model, to predict a set of test cases to execute for testing the software in the software development platform, wherein the neural network model is trained based on historical software data associated with the software development platform (block 520). For example, the device (e.g., using computing resource 224, processor 320, memory 330, and/or the like) may process the software data, with a neural network model, to predict a set of test cases to execute for testing the software in the software development platform, as described above. In some implementations, the neural network model may be trained based on historical software data associated with the software development platform.

As further shown in FIG. 5, process 500 may include processing the set of test cases, with an execution model, to identify configurations, scripts, and test targets for executing the set of test cases in the software development platform, wherein the execution model is trained based on historical test configuration data, and wherein the historical test configuration data includes data identifying historical sets of test cases, historical types of executions performed for the historical sets of test cases and historical target devices utilized to perform the executions (block 530). For example, the device (e.g., using computing resource 224, processor 320, storage component 340, and/or the like) may process the set of test cases, with an execution model, to identify configurations, scripts, and test targets for executing the set of test cases in the software development platform, as described above. In some implementations, the execution model may be trained based on historical test configuration data that includes data identifying historical sets of test cases, historical types of executions performed for the historical sets of test cases, and historical target devices utilized to perform the executions.

As further shown in FIG. 5, process 500 may include performing one or more actions based on the set of test cases, the configurations, the scripts, and the test targets (block 540). For example, the device (e.g., using computing resource 224, processor 320, memory 330, storage component 340, communication interface 370, and/or the like) may perform one or more actions based on the set of test cases, the configurations, the scripts, and the test targets, as described above.

Process 500 may include additional implementations, such as any single implementation or any combination of implementations described below and/or in connection with one or more other processes described elsewhere herein.

In a first implementation, process 500 may include storing the historical software data in a data structure accessible by the neural network model, and storing the historical test configuration data in the data structure accessible by the execution model.

In a second implementation, alone or in combination with the first implementation, the test targets may include one or more mobile devices, one or more device platforms, one or more operating system versions, one or more desktop browsers, or one or more cloud devices.

In a third implementation, alone or in combination with one or more of the first and second implementations, performing the one or more actions may include process 500 configuring software testing tools of the software development platform based on the configurations; configuring the set of test cases, the scripts, and the test targets for execution based on the configurations; causing the set of test cases to be executed on the test targets, via the software testing tools and based on the scripts; and providing, for display, results of executing the set of test cases.

In a fourth implementation, alone or in combination with one or more of the first through third implementations, performing the one or more actions may include process 500 configuring the set of test cases based on the configurations and the scripts; causing the set of test cases to be executed via the test targets and with a test configuration AI; receiving, via the test configuration AI, a voice command associated with execution of the set of test cases; processing the voice command with a natural language processing technique to identify a request associated with a particular test case of the set of test cases; and causing the request associated with the particular test case to be implemented via at least one of the test targets.

In a fifth implementation, alone or in combination with one or more of the first through fourth implementations, the execution model may include a deep learning model.

In a sixth implementation, alone or in combination with one or more of the first through fifth implementations, the set of test cases may include a suite of test cases to execute for testing the software in the software development platform.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
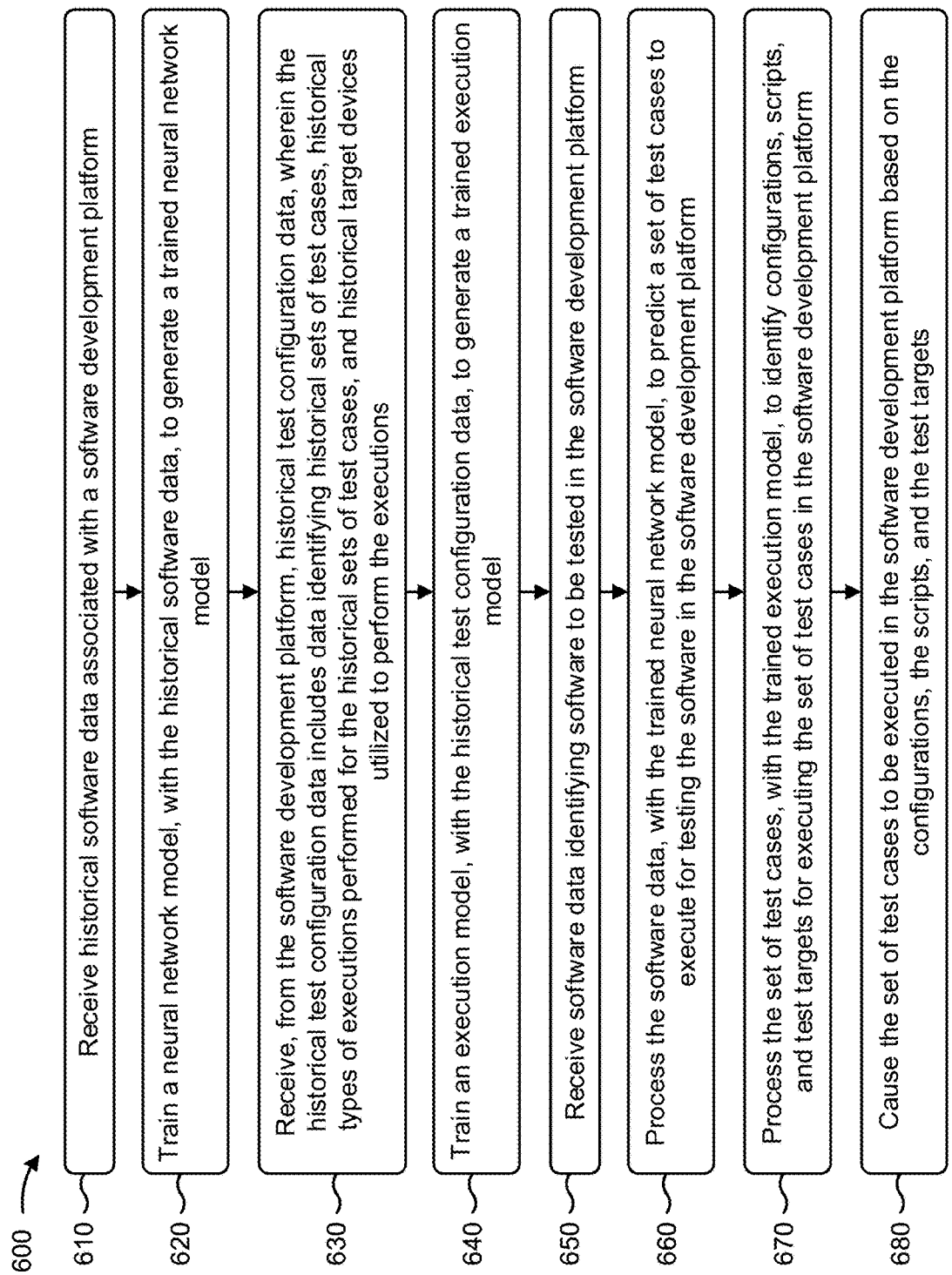

FIG. 6 is a flow chart of an example process 600 for utilizing neural network and artificial intelligence models to select and execute test cases in a software development platform. In some implementations, one or more process blocks of FIG. 6 may be performed by a device (e.g., testing platform 220). In some implementations, one or more process blocks of FIG. 6 may be performed by another device or a group of devices separate from or including the device, such as a client device (e.g., client device 210), a server device (e.g., server device 240), and/or the like.

As shown in FIG. 6, process 600 may include receiving historical software data associated with a software development platform (block 610). For example, the device (e.g., using computing resource 224, processor 320, communication interface 370, and/or the like) may receive historical software data associated with a software development platform, as described above.

As further shown in FIG. 6, process 600 may include training a neural network model, with the historical software data, to generate a trained neural network model (block 620). For example, the device (e.g., using computing resource 224, processor 320, memory 330, and/or the like) may train a neural network model, with the historical software data, to generate a trained neural network model, as described above.

As further shown in FIG. 6, process 600 may include receiving, from the software development platform, historical test configuration data, wherein the historical test configuration data includes data identifying historical sets of test cases, historical types of executions performed for the historical sets of test cases, and historical target devices utilized to perform the executions (block 630). For example, the device (e.g., using computing resource 224, processor 320, communication interface 370, and/or the like) may receive, from the software development platform, historical test configuration data, as described above. In some implementations, the historical test configuration data may include data identifying historical sets of test cases, historical types of executions performed for the historical sets of test cases, and historical target devices utilized to perform the executions.

As further shown in FIG. 6, process 600 may include training an execution model, with the historical test configuration data, to generate a trained execution model (block 640). For example, the device (e.g., using computing resource 224, processor 320, storage component 340, and/or the like) may train an execution model, with the historical test configuration data, to generate a trained execution model, as described above.

As further shown in FIG. 6, process 600 may include receiving software data identifying software to be tested in the software development platform (block 650). For example, the device (e.g., using computing resource 224, processor 320, communication interface 370, and/or the like) may receive software data identifying software to be tested in the software development platform, as described above.

As further shown in FIG. 6, process 600 may include processing the software data, with the trained neural network model, to predict a set of test cases to execute for testing the software in the software development platform (block 660). For example, the device (e.g., using computing resource 224, processor 320, memory 330, storage component 340, and/or the like) may process the software data, with the trained neural network model, to predict a set of test cases to execute for testing the software in the software development platform, as described above.

As further shown in FIG. 6, process 600 may include processing the set of test cases, with the trained execution model, to identify configurations, scripts, and test targets for executing the set of test cases in the software development platform (block 670). For example, the device (e.g., using computing resource 224, processor 320, storage component 340, and/or the like) may process the set of test cases, with the trained execution model, to identify configurations, scripts, and test targets for executing the set of test cases in the software development platform, as described above.

As further shown in FIG. 6, process 600 may include causing the set of test cases to be executed in the software development platform based on the configurations, the scripts, and the test targets (block 680). For example, the device (e.g., using computing resource 224, processor 320, memory 330, storage component 340, communication interface 370, and/or the like) may cause the set of test cases to be executed in the software development platform based on the configurations, the scripts, and the test targets, as described above.

Process 600 may include additional implementations, such as any single implementation or any combination of implementations described below and/or in connection with one or more other processes described elsewhere herein.

In a first implementation, processing the software data, with the trained neural network model, to predict the set of test cases may include process 600 generating a feature representation schema based on the software data; providing the feature representation schema to the trained neural network model; determining which test cases, of a plurality of test cases, are likely to be necessary for execution based on providing the feature representation schema to the trained neural network model; and including the test cases that are likely to be necessary for execution in the set of test cases.

In a second implementation, alone or in combination with the first implementation, process 600 may further include utilizing natural language processing and a test configuration AI to cause the set of test cases to be executed in the software development platform; causing the set of test cases to be executed on the test targets based on the configurations and the scripts; or providing results of execution of the set of test cases for display.

In a third implementation, alone or in combination with one or more of the first and second implementations, process 600 may further include providing recommendations for new test cases or different test cases based on results of execution of the set of test cases; providing recommendations for corrections to the software based on results of execution of the set of test cases; or causing the corrections to the software to be automatically implemented by the software development platform.

In a fourth implementation, alone or in combination with one or more of the first through third implementations, process 600 may further include configuring software testing tools of the software development platform based on the configurations; configuring the set of test cases, the scripts, and the test targets for execution based on the configurations; causing the set of test cases to be executed on the test targets, via the software testing tools and based on the scripts; and providing, for display, results of executing the set of test cases.

In a fifth implementation, alone or in combination with one or more of the first through fourth implementations, process 600 may further include configuring the set of test cases based on the configurations and the scripts; causing the set of test cases to be executed via the test targets and with a test configuration AI; receiving, via the test configuration AI, a voice command associated with execution of the set of test cases; processing the voice command with a natural language processing technique to identify a request associated with a particular test case of the set of test cases; and causing the request associated with the particular test case to be implemented via at least one of the test targets.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a device, historical software data associated with a software development platform;
   training, by the device, a neural network model, with the historical software data, to generate a trained neural network model;
   receiving, by the device and from the software development platform, historical test configuration data,
      wherein the historical test configuration data includes data identifying:
         historical sets of test cases,
         historical types of executions performed for the historical sets of test cases, and
         historical target devices utilized to perform the executions;
   training, by the device, an execution model, with the historical test configuration data, to generate a trained execution model;
   receiving, by the device, software data identifying software to be tested in the software development platform;
   processing, by the device, the software data, with the trained neural network model, to predict a set of test cases to execute for testing the software in the software development platform;
   processing, by the device, the set of test cases, with the trained execution model, to identify one or more of configurations, scripts, or test targets for executing the set of test cases in the software development platform; and
   performing, by the device, one or more actions based on the set of test cases and the one or more of the configurations, the scripts, or the test targets.

2. The method of claim 1, wherein the historical software data includes data identifying one or more of:
   software requirements that were introduced or modified,
   software code modules implemented for the software requirements,
   interactions between components of software testing tools of the software development platform,
   dependencies among software code, or
   corrections for software bugs.

3. The method of claim 1, wherein processing the software data, with the trained neural network model, to predict the set of test cases comprises:
   generating a feature representation schema based on the software data;
   providing the feature representation schema to the trained neural network model;
   determining which test cases, of a plurality of test cases, are likely to be necessary for execution based on providing the feature representation schema to the trained neural network model; and
   including the test cases that are likely to be necessary for execution in the set of test cases.

4. The method of claim 1, wherein the neural network model includes:
   a neural network with logistic regression model,
   rectified linear unit activation for intermediate layers, and
   sigmoid activation for a final layer.

5. The method of claim 1, wherein the neural network model includes one or more of:
   a long short-term memory model,
   a time-series model, or
   a neural network with logistic regression model.

6. The method of claim 1, wherein performing the one or more actions comprises one or more of:
   causing the set of test cases to be executed in the software development platform based on the one or more of the configurations, the scripts, or the test targets;
   utilizing natural language processing and a test configuration artificial intelligence to cause the set of test cases to be executed in the software development platform;
   causing the set of test cases to be executed on the test targets based on the configurations and the scripts; or
   providing results of execution of the set of test cases for display.

7. The method of claim 1, wherein performing the one or more actions comprises one or more of:
   providing recommendations for new test cases or different test cases based on results of execution of the set of test cases;
   providing recommendations for corrections to the software based on results of execution of the set of test cases;
   causing the corrections to the software to be automatically implemented by the software development platform; or
   retraining the neural network model or the execution model based on the set of test cases and the one or more of the configurations, the scripts, or the test targets.

8. A device, comprising:
   one or more memories; and
   one or more processors, communicatively coupled to the one or more memories, configured to:
      receive software data identifying software to be tested in a software development platform;
      process the software data, with a neural network model, to predict a set of test cases to execute for testing the software in the software development platform,
         wherein the neural network model is trained based on historical software data associated with the software development platform;
      process the set of test cases, with an execution model, to identify configurations, scripts, and test targets for executing the set of test cases in the software development platform,
         wherein the execution model is trained based on historical test configuration data,
            wherein the historical test configuration data includes data identifying:
               historical sets of test cases,
               historical types of executions performed for the historical sets of test cases, and
               historical target devices utilized to perform the executions; and
      perform one or more actions based on the set of test cases, the configurations, the scripts, and the test targets.

9. The device of claim 8, wherein the one or more processors are further configured to:
   store the historical software data in a data structure accessible by the neural network model; and
   store the historical test configuration data in the data structure accessible by the execution model.

10. The device of claim 8, wherein the test targets include one or more of:
    one or more mobile devices,
    one or more device platforms,
    one or more operating system versions,
    one or more desktop browsers, or
    one or more cloud devices.

11. The device of claim 8, wherein the one or more processors, when performing the one or more actions, are configured to:
- configure software testing tools of the software development platform based on the configurations;
- configure the set of test cases, the scripts, and the test targets for execution based on the configurations;
- cause the set of test cases to be executed on the test targets, via the software testing tools and based on the scripts; and
- provide, for display, results of executing the set of test cases.

12. The device of claim 8, wherein the one or more processors, when performing the one or more actions, are configured to:
- configure the set of test cases based on the configurations and the scripts;
- cause the set of test cases to be executed via the test targets and with a test configuration artificial intelligence;
- receive, via the test configuration artificial intelligence, a voice command associated with execution of the set of test cases;
- process the voice command with a natural language processing technique to identify a request associated with a particular test case of the set of test cases; and
- cause the request associated with the particular test case to be implemented via at least one of the test targets.

13. The device of claim 8, wherein the execution model includes a deep learning model.

14. The device of claim 8, wherein the set of test cases includes a suite of test cases to execute for testing the software in the software development platform.

15. A non-transitory computer-readable medium storing instructions, the instructions comprising:
- one or more instructions that, when executed by one or more processors, cause the one or more processors to:
  - receive historical software data associated with a software development platform;
  - train a neural network model, with the historical software data, to generate a trained neural network model;
  - receive, from the software development platform, historical test configuration data,
    - wherein the historical test configuration data includes data identifying:
      - historical sets of test cases,
      - historical types of executions performed for the historical sets of test cases, and
      - historical target devices utilized to perform the executions;
  - train an execution model, with the historical test configuration data, to generate a trained execution model;
  - receive software data identifying software to be tested in the software development platform;
  - process the software data, with the trained neural network model, to predict a set of test cases to execute for testing the software in the software development platform;
  - process the set of test cases, with the trained execution model, to identify configurations, scripts, and test targets for executing the set of test cases in the software development platform; and
  - cause the set of test cases to be executed in the software development platform based on the configurations, the scripts, and the test targets.

16. The non-transitory computer-readable medium of claim 15, wherein the one or more instructions, that cause the one or more processors to process the software data, with the trained neural network model, to predict the set of test cases, cause the one or more processors to:
- generate a feature representation schema based on the software data;
- provide the feature representation schema to the trained neural network model;
- determine which test cases, of a plurality of test cases, are likely to be necessary for execution based on providing the feature representation schema to the trained neural network model; and
- include the test cases that are likely to be necessary for execution in the set of test cases.

17. The non-transitory computer-readable medium of claim 15, wherein the instructions further comprise:
- one or more instructions that, when executed by the one or more processors, cause the one or more processors to one or more of:
  - utilize natural language processing and a test configuration artificial intelligence to cause the set of test cases to be executed in the software development platform;
  - cause the set of test cases to be executed on the test targets based on the configurations and the scripts; or
  - provide results of execution of the set of test cases for display.

18. The non-transitory computer-readable medium of claim 15, wherein the instructions further comprise:
- one or more instructions that, when executed by the one or more processors, cause the one or more processors to one or more of:
  - provide recommendations for new test cases or different test cases based on results of execution of the set of test cases;
  - provide recommendations for corrections to the software based on results of execution of the set of test cases; or
  - cause the corrections to the software to be automatically implemented by the software development platform.

19. The non-transitory computer-readable medium of claim 15, wherein the instructions further comprise:
- one or more instructions that, when executed by the one or more processors, cause the one or more processors to:
  - configure software testing tools of the software development platform based on the configurations;
  - configure the set of test cases, the scripts, and the test targets for execution based on the configurations;
  - cause the set of test cases to be executed on the test targets, via the software testing tools and based on the scripts; and
  - provide, for display, results of executing the set of test cases.

20. The non-transitory computer-readable medium of claim 15, wherein the instructions further comprise:
- one or more instructions that, when executed by the one or more processors, cause the one or more processors to:
  - configure the set of test cases based on the configurations and the scripts;
  - cause the set of test cases to be executed via the test targets and with a test configuration artificial intelligence;

receive, via the test configuration artificial intelligence, a voice command associated with execution of the set of test cases;
process the voice command with a natural language processing technique to identify a request associated with a particular test case of the set of test cases; and
cause the request associated with the particular test case to be implemented via at least one of the test targets.

\* \* \* \* \*